(12) United States Patent
Stern

(10) Patent No.: US 7,080,817 B2
(45) Date of Patent: Jul. 25, 2006

(54) ELECTROMAGNETIC VALVE

(75) Inventor: Yuval Stern, Nes Ziyonna (IL)

(73) Assignee: Y. Stern Engineering (1989) Ltd., Nes Ziyyona (IL)

( * ) Notice: Subject to any disclaimer, the term of this patent is extended or adjusted under 35 U.S.C. 154(b) by 0 days.

(21) Appl. No.: 10/778,328

(22) Filed: Feb. 17, 2004

(65) Prior Publication Data

US 2005/0178989 A1 Aug. 18, 2005

(51) Int. Cl.
*F16K 31/126* (2006.01)

(52) U.S. Cl. .............. 251/30.04; 251/129.17

(58) Field of Classification Search .. 251/30.01–30.05, 251/129.17
See application file for complete search history.

(56) References Cited

U.S. PATENT DOCUMENTS

| | | | |
|---|---|---|---|
| 5,169,117 A | 12/1992 | Huang | |
| 5,361,802 A | 11/1994 | Kroll et al. | |
| 5,813,652 A * | 9/1998 | Richmond et al. | 251/30.03 |
| 5,911,240 A | 6/1999 | Kolar et al. | |
| 5,915,665 A * | 6/1999 | Paese et al. | 251/30.04 |
| 5,941,502 A | 8/1999 | Cooper | |
| 5,996,965 A | 12/1999 | Eichholz et al. | |
| 6,003,838 A * | 12/1999 | Beck | 251/129.17 |
| 6,017,015 A * | 1/2000 | Heusser | 251/30.04 |
| 6,142,171 A | 11/2000 | Hancock | |
| 6,234,449 B1 | 5/2001 | Ortner et al. | |
| 6,305,662 B1 * | 10/2001 | Parsons et al. | 251/129.04 |
| 6,443,420 B1 * | 9/2002 | Hettinger | 251/30.04 |
| 6,752,371 B1 * | 6/2004 | Herbert et al. | 251/129.17 |

FOREIGN PATENT DOCUMENTS

| | | |
|---|---|---|
| FR | 2 484 596 | 12/1981 |
| GB | 2 335 233 | 9/1999 |

\* cited by examiner

*Primary Examiner*—John Bastianelli
(74) *Attorney, Agent, or Firm*—Nath & Associates PLLC; Gregory B. Kang; Teresa M. Arroyo

(57) ABSTRACT

A valve of the pilot type including a housing with a circular cylinder end for mounting in a valve base. The housing has an inlet port, an outlet port, an internal cavity, and a flexible membrane dividing the cavity into a flow chamber and control chamber. The inlet port is in constant communication with the flow chamber, while the outlet port is in communication with the flow chamber via a valve seat formed in the housing opposite the membrane. The outlet port is formed at the face of the cylinder end. An annular seal is disposed on that face, around the outlet port, such that when the valve is mounted into the valve base, the seal is urged axially to a face of the valve base providing fluid-tight communication between the outlet port and an outlet opening in the valve base. The inlet port is formed at the lateral surface of the cylinder end, so as to provide inlet flow transverse to the axis of the cylinder end.

8 Claims, 2 Drawing Sheets

ELECTROMAGNETIC VALVE

FIELD OF THE INVENTION

This invention relates to valves of the pilot type, in particular to self-contained valves comprising both the valve seat and the closing membrane.

BACKGROUND OF THE INVENTION

U.S. Pat. No. 5,996,965 describes a solenoid valve of the pilot type especially intended for wet-room fittings. It has a housing with an inlet and an outlet port sealed off from each other by a membrane with a body that rests on a valve seat. The housing has a generally cylinder form with coaxial external thread. The inlet and the outlet ports are coaxial and are perpendicular to an end of the cylinder such that the inlet flow is opposite to the outlet flow. The outlet port is at the cylinder axis and is formed as a tubular body protruding from the valve housing. The solenoid valve is sealed in a plumbing fitting by two coaxial O-rings—one on the lateral surface of the housing and one on the lateral surface of the tubular body.

SUMMARY OF THE INVENTION

In accordance with the present invention, there is provided a valve of the pilot type comprising a housing with a cylinder end having lateral surface, axis and an end face perpendicular thereto, for mounting in a valve base with an outlet opening formed in a face of the base, and an inlet opening, the housing having an inlet port at the cylinder end, an outlet port at the end face, an internal cavity, and a flexible membrane dividing the cavity into a flow chamber and control chamber. The inlet port is in constant communication with the flow chamber, while the outlet port is in communication with the flow chamber via a valve seat formed in the housing opposite the membrane and closable by displacement of the membrane. The end face is formed to receive an annular seal, for example a flat ring, disposed around the outlet port, such that when the valve is mounted to the valve base, the annular seal is urged axially to the face of the base providing fluid-tight communication between the outlet port and the outlet opening.

The valve has a bleed channel connecting the flow chamber and the control chamber, preferably obtained through the membrane. The valve has a pilot channel connecting the outlet port with the control chamber and closable by a control element. The control element may be, for example, a solenoid armature in a valve of solenoid type.

In a preferred embodiment of the invention, the inlet port of the valve is formed at the lateral surface of the cylinder end, so as to provide inlet flow transverse to the axis. If the face with the outlet opening, and the inlet opening are in a cylinder recess of the valve base, then a second annular seal may be disposed at the lateral surface, such that, when the cylinder end is mounted to the valve base, the second seal seals against the cylindrical recess, providing, together with the first annular seal, fluid-tight communication between the inlet port and the inlet opening.

The valve may have a filtering mesh disposed around the inlet port at the lateral side of the cylinder end.

Preferably, the membrane has a central part made of hard material which is firmly attached to the housing, and the pilot channel is obtained through the attached part. The rest part of the membrane is formed as an integral resilient disk comprising five adjacent annular parts, from the periphery to the center: an outer ring for mounting to the housing, a first thin flexible ring, a thick ring for sealing the valve seat, a second thin flexible ring, and an annular lip for sealing around the attached part.

The outlet seal on the cylinder face and the lateral transverse inlet provide for certain significant advantages, such as for example:

good quality of assembly and tightness of the connections between the valve and the valve base is easier, more effective and cheaper to achieve than with the known valves with axial inlet and outlet;

an outlet channel in the valve base may be eccentric to the valve axis, or non-parallel; the face in the valve base abutting the flat ring seal does not need to be precisely flat;

the diameter of the outlet channel in the valve base may vary within a large range;

shortened and streamlined flow path through the valve;

reduced length of the valve and reduced size of the valve base;

reduced machined area and machining work;

larger available area for disposing a filter mesh around the inlet port than the known design with axial inlet and outlet; and suitability for retrofitting mechanical stop-valves using the former valve seat as sealing surface of the valve base.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
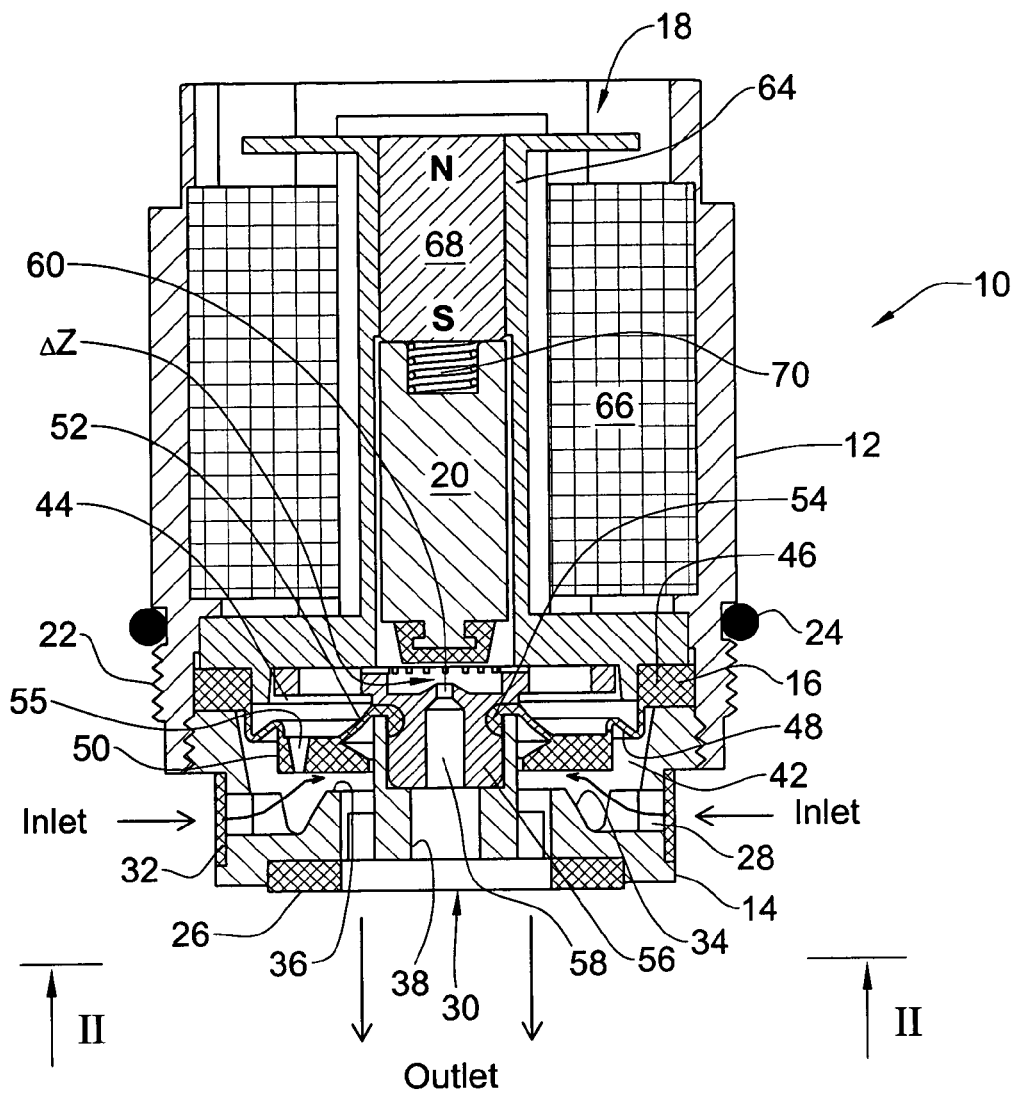
FIG. 1 is a sectional elevation of an electromagnetic valve in accordance with the present invention, in open position.
Figure 2:
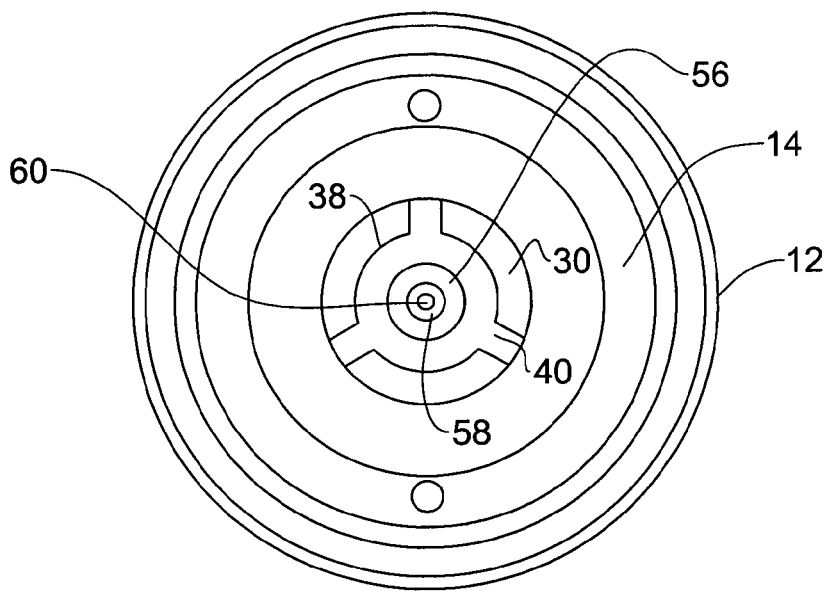
FIG. 2 is an axial view of the electromagnetic valve of FIG. 1.
Figure 3:
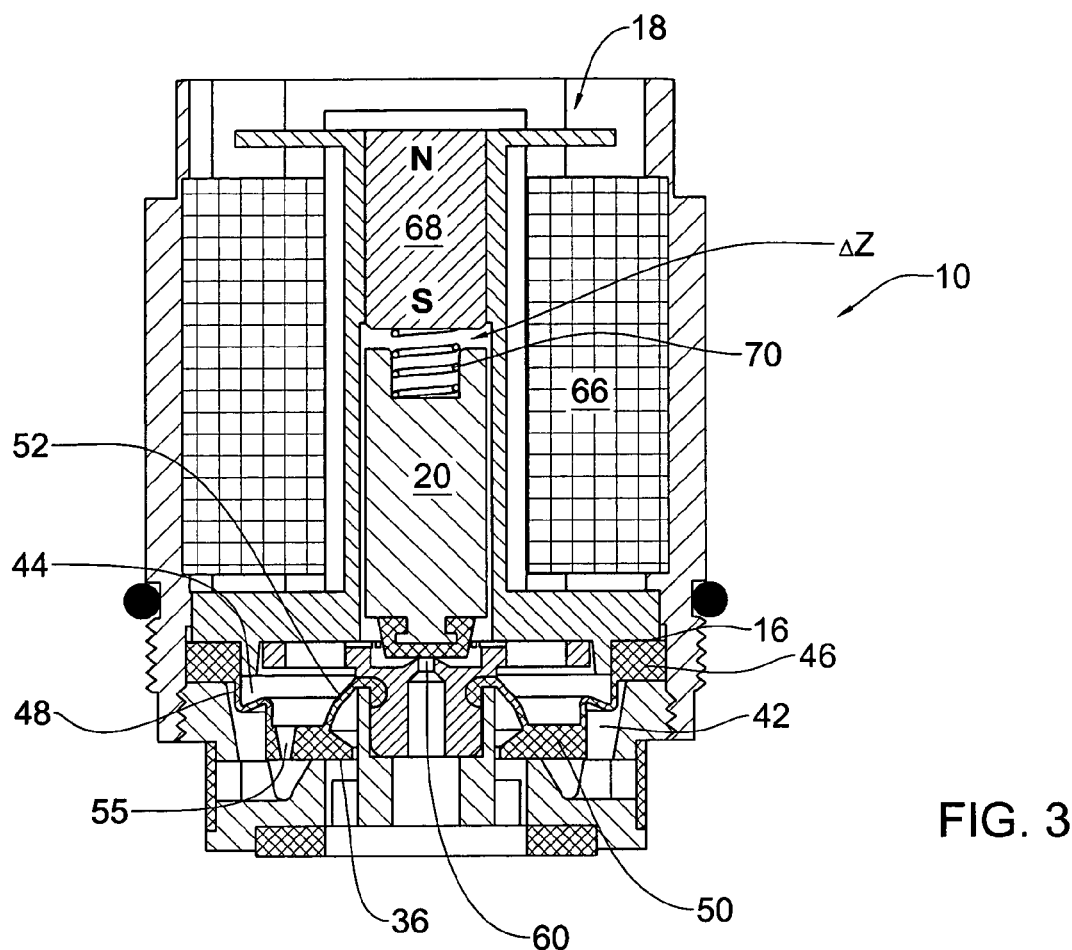
FIG. 3 shows the electromagnetic valve of FIG. 1 in closed position.

With reference to FIGS. 1 to 3, an electromagnetic valve 10 of the pilot type, according to the invention, comprises a housing 12 with a threaded lid 14, a flexible membrane 16, and a bi-stable solenoid 18 with movable armature (plunger) 20. The valve may include electronic control circuits and power source which are not shown.

The housing 12 is of generally cylinder shape and has an outer thread 22, an O-ring seal 24 and a flat ring seal 26 (in a recess of the lid 14), all coaxial with the housing, for mounting in a valve base, as will be shown further. The lid 14 of the housing has an inlet port 28 terminating at the lateral surface of the cylinder and a central outlet port 30 at the face of the cylinder. An annular filtering mesh 32 is surrounding the inlet port 28. At the inner side of the lid 14, there is a protruding annular rim 34 defining an internal end of the outlet port 30 with a precisely formed edge constituting a valve seat 36. A tubular support 38 is disposed at the axis of the lid 14, in the middle of the outlet port 30, and is connected thereto by three bridges 40. The lid 14 is assembled to the housing 12 so as to define an internal cavity in communication with the inlet port 28 and the outlet port 30. The lid also tightly fixes the membrane 16 at its periphery and at its center, as will be explained below.

The membrane 16 is a resilient disk disposed across the internal cavity of the housing 12 and dividing it into a flow chamber 42 and control chamber 44 so that the inlet port 28 and the outlet port 30 remain in communication with the flow chamber. The membrane comprises an outer ring 46, a first thin corrugated ring 48, a thick valve ring 50 for sealing the valve seat 36, a second thin ring 52, and an internal annular lip 54. The outer ring 46 is restrained between the housing 12 and the lid 14. Due to the resilience of the thin rings 48 and 52, the valve ring 50 may be moved to or off the valve seat 36, between open and closed positions shown in FIGS. 1 and 3, respectively. An off-center bleeding channel 55 across the membrane 16 connects the flow chamber 42 to the control chamber 44. In the membrane center, there is an adapter 56 with an annular outer notch tightly accommodating the lip 54. The adapter 56 has a pilot channel 58 formed as an axial bore with a nozzle 60. The adapter 56, together with the annular lip 54 is fixed to the housing 12 by means of the tubular support 38, so that the pilot channel 58 connects the control chamber 44 to the outlet port 30, the nozzle 60 facing the control chamber 44.

The bi-stable solenoid 18 comprises a tubular base 64 coaxial with the housing 12 and adjacent to the control chamber 44, a wire coil 66 wound around the base 64, the plunger 20 freely disposed in a part of the tubular base 64 opposite the nozzle 60, a permanent magnet 68 fixed in the distal part of the base 64, and a compression spring 70 between the plunger 20 and the magnet 68. The plunger 20 is made of magnetically soft material, and may be moved by an axial travel $\Delta Z$ between the permanent magnet 68 and the nozzle 60. The magnetization of the magnet 68 and the strength of the spring 70 are selected so that the magnet 68 is capable of holding the plunger 20 when the latter abuts the magnet (open position, FIG. 1) but cannot attract the plunger back from the travel distance $\Delta Z$ (closed position, FIG. 3). Switching of the plunger from closed to open position is provided by energizing the solenoid coil 66 to create magnetic field co-acting with the permanent magnet 68, and vice-versa.

The electromagnetic valve 10 operates in a manner known per se in the art, as a stop valve between a high-pressure fluid source connected to the inlet port 28 and a low-pressure sink connected to the outlet port 30. In the closed position shown in FIG. 3, the valve ring 50 is lowered onto the valve seat 36, thereby sealing the outlet port 30 from the flow chamber 42 and closing the valve. The plunger 20 is urged against the nozzle 60 by the spring 70, thus sealing the pilot channel 58 between the control chamber 44 and the outlet port 30. Due to the bleed channel 55, the pressure in the control chamber 44 is equal to the high inlet pressure in the flow chamber 42. However, the membrane area exposed to the high pressure in the control chamber 44 is greater than the area under the same high pressure in the flow chamber 42, so that the resulting force urges the membrane 16 against the valve seat 36 keeping the valve closed.

By switching the solenoid 18, the plunger 20 is attracted to the magnet 68 and the nozzle 60 is opened. The control chamber 44 is thus connected to the low-pressure outlet port 30 and the pressure therein falls. The resulting force on the membrane 16 changes direction and the valve ring 50 lifts off the valve seat 36, thereby opening the valve. Now both sides of the membrane 16, with equal areas, are in communication with the high-pressure inlet port and the low-pressure outlet port. However, the bleed channel 55 is sufficiently narrow, so that the flow therethrough cannot equalize the pressures at the two sides of the membrane 16, and the valve remains open.

By another switching of the solenoid 18, the plunger 20 is pushed off the magnet 68 and the nozzle 60 is closed. As the communication with the low-pressure outlet 30 is interrupted, the pressure in the control chamber 44 builds up and the valve ring 50 lowers onto the valve seat 36 closing the valve and restoring the position of FIG. 1. Thus, significant flow rates may be controlled by a low-power electromagnetic valve.

Figure 4:
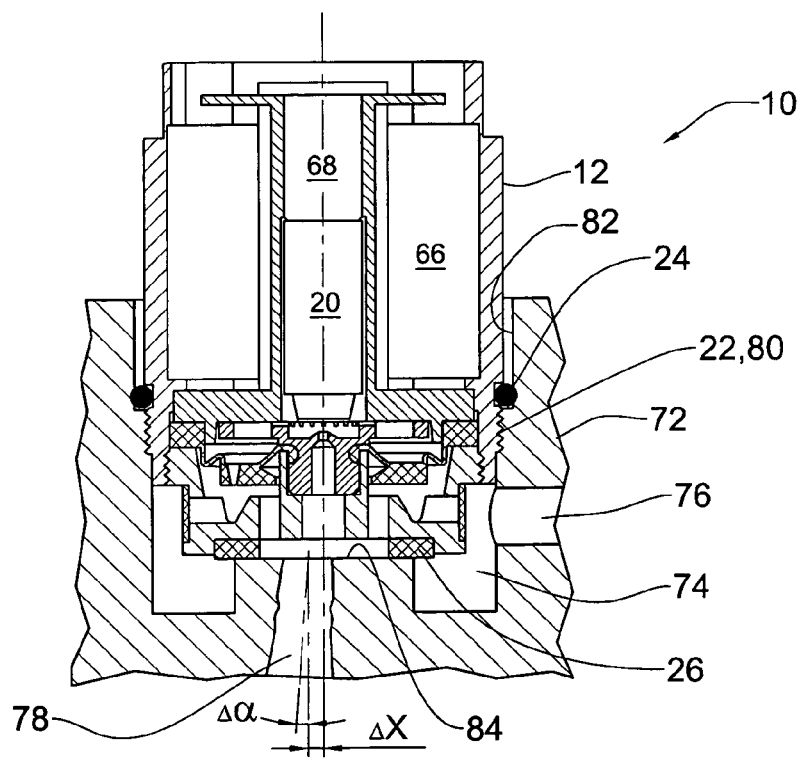
FIG. 4 shows mounting of the electromagnetic valve in a valve base.

The advantages of the electromagnetic valve of the present invention will be better understood in its assembly to a plumbing fitting or a valve base 72, which may be an existing valve body, as shown in FIG. 4. The valve base 72 has a mounting recess 74, an inlet channel 76 and an outlet channel 78 with their openings in the mounting recess 74. The recess 74 has a threaded step 80 corresponding to the thread 22 of the valve housing 12, a machined step 80 tightly accommodating the O-ring 24, and a machined face 84 abutting the flat ring 26.

It will be appreciated that the good quality of assembly and the tightness of the connections between the valve 10 and the valve base 72 depend on the precise machining of the assembly surfaces (such as the threaded step 80, the step 82 and the face 84). It is easier, more effective and cheaper to achieve such quality with the valve of the present invention having a lateral inlet, and an axial abutment of the outlet seal, than with the known valves with axial inlet and outlet and two lateral sealing rings. The outlet channel 78 of the valve base 72 may be eccentric to the valve axis ($\Delta X$), or non-parallel ($\Delta \alpha$). The diameter of the outlet channel also may vary within a large range. The face 84 does not even need to be precisely flat. This is not possible in known valves which are sealed by two O-rings at the lateral side of the housing.

The inventive design also allows to reduce and streamline the flowpath through the electromagnetic valve, to reduce the length of the valve and the size of the valve base, and to reduce the machined area and machining work.

The inventive design is especially suitable for retrofitting a mechanical stop-valve where the former valve seat can be used as the face 84.

Although a description of specific embodiment has been presented, it is contemplated that various changes could be made without deviating from the scope of the present invention. For example, the present invention could be used with other types of valves.

The invention claimed is:

1. A valve of the pilot type comprising:
   a housing with a cylinder end having a lateral surface, axis and an end face perpendicular thereto, for mounting in a valve base having a cylindrical recess accommodating said cylinder end, with an outlet opening formed in a face of said cylindrical recess, and an inlet opening,
   said housing having an inlet port at said cylinder end, an outlet port at said end face, an internal cavity and a flexible membrane dividing said cavity into a flow chamber and control chamber,
   said inlet port being in constant communication with said flow chamber,
   said outlet port being in communication with said flow chamber via a valve seat formed in the housing opposite said membrane and closable by displacement of said membrane,
   said valve further having a bleed channel connecting said flow chamber and said control chamber, a pilot channel connecting said outlet port with said control chamber, closable by a control element, wherein said end face is formed to receive a first annular seal disposed around said outlet port, such that when said valve is mounted into said valve base, said first seal is urged axially to said face of the cylindrical recess providing fluid-tight communication between said outlet port and said outlet opening, and said inlet port is formed at said lateral surface so as to provide inlet flow transverse to said axis, wherein said pilot channel is obtained through said membrane, and wherein said membrane has a part thereof firmly attached to said housing, and said pilot channel is obtained through the attached part.

2. The valve according to claim 1, wherein said inlet opening of the valve base is in said cylindrical recess, and said lateral surface is formed to receive a second annular seal thereon, such that when said cylinder end is mounted into said cylindrical recess, said second seal is urged to said cylindrical recess providing, together with said first seal, fluid-tight communication between said inlet port and said inlet opening.

3. The valve according to claim 1, further comprising an annular filtering element fitted on said inlet port at said lateral surface.

4. The valve according to claim 1, wherein said bleed channel is formed through said membrane.

5. The valve according to claim 1, wherein said valve has a solenoid and said control element is a movable armature of said solenoid.

6. The valve according to claim 1, wherein said attached part is in the center of the membrane.

7. The valve according to claim 6, wherein said attached part is made of hard material at least sealed to the rest part of the membrane.

8. The valve according to claim 7, wherein said rest part of the membrane is formed as an integral resilient disk comprising five adjacent annular parts, from the periphery to the center: an outer ring for mounting to said housing, a first thin flexible ring, a thick ring for sealing said valve seat, a second thin flexible ring, and an annular lip for sealing around said attached part.

* * * * *